United States Patent [19]

Miller

[11] 4,212,735
[45] Jul. 15, 1980

[54] DESTRUCTION METHOD FOR THE WET COMBUSTION OF ORGANICS

[75] Inventor: Richard A. Miller, Knoxville, Tenn.

[73] Assignee: Hydroscience, Inc., Emerson, N.J.

[21] Appl. No.: 16,645

[22] Filed: Mar. 1, 1979

[51] Int. Cl.$^2$ .............................................. C02C 5/04
[52] U.S. Cl. .................................. 210/63 R; 252/434
[58] Field of Search ............... 210/63 R, 71; 252/434, 252/438, 441

[56] References Cited

U.S. PATENT DOCUMENTS

| | | | |
|---|---|---|---|
| 2,029,958 | 2/1936 | Urbain | 210/63 R |
| 3,850,843 | 11/1974 | Kunugi et al. | 252/438 |
| 3,984,311 | 10/1976 | Diesen et al. | 210/63 R |
| 3,988,259 | 10/1976 | Ray | 210/63 R |
| 4,052,302 | 10/1977 | Fletcher et al. | 210/63 R |
| 4,141,829 | 2/1979 | Thiel et al. | 210/63 R |
| 4,145,283 | 3/1979 | Topp et al. | 210/63 R |
| 4,155,879 | 5/1979 | Mimoun et al. | 252/434 |

*Primary Examiner*—Benoit Castel
*Attorney, Agent, or Firm*—Gary R. Plotecher

[57] ABSTRACT

The method of oxidizing organic compounds, such as 1,3,5-trichlorobenzene, in an aqueous system of pH not more than about 4, the method comprising oxidizing the organic compound by contacting the compound with an oxidizing agent, such as air, in the aqueous system in the presence of a catalytic amount of a cocatalyst system, is improved by using as the cocatalyst system a catalytic combination of nitrate ions, at least one of either bromide ions or iodide ions, and transition metal ions of at least one transition metal having two or more oxidation states, such as vanadium ions. This cocatalyst system enhances the rate of oxidation of the organic compounds.

17 Claims, No Drawings

DESTRUCTION METHOD FOR THE WET COMBUSTION OF ORGANICS

BACKGROUND OF THE INVENTION

1. Field of the Invention

This invention relates to the wet combustion of organics. The invention relates to an improved method of oxidizing organics in the presence of the novel cocatalyst system.

2. Description of the Prior Art

U.S. Pat. No. 3,984,311 teaches the use of an anionic cocatalyst system for the oxidation of organic compounds in aqueous systems. The cocatalyst system comprises nitrate ions and at least one of either bromide or iodide ions. The organics are oxidized by contacting an aqueous solution or system having a pH of no more than about 4 with an oxidizing agent, such as air, in the presence of a catalytic amount of the cocatalyst system at sufficient temperature to effect oxidation, such as a temperature between about 150°–300° C.

While U.S. Pat. No. 3,984,311 has demonstrated utility, not all aspects of its teaching are completely satisfactory. For example, the method of U.S. Pat. No. 3,984,311 has an undesirably low rate of oxidation for aromatic, water-insoluble organics. This relatively slow rate of oxidation increases the capital requirement of equipment needed to process aqueous streams (systems) containing such organics. Consequently, a need exists to improve the method of U.S. Pat. No. 3,984,311 such that the rate of oxidation is increased.

SUMMARY OF THE INVENTION

According to this invention, a method for the oxidation of organic compounds in an aqueous system of pH not more than about 4 to reduce the total organic carbon content of the system, the method comprising oxidizing the organic compound by contacting the compound with an oxidizing agent in the aqueous system in the presence of a catalytic amount of a cocatalyst system, is improved by using as the cocatalyst system a catalytic combination comprising:

(1) nitrate ions,
(2) at least one of either bromide ions or iodide ions, and
(3) transition metal ions of at least one transition metal having two or more oxidation states, at a sufficient temperature to effect oxidation. This improved method demonstrates an increased rate of oxidation of the organic compounds, especially organic compounds that are difficult to oxidize.

DETAILED DESCRIPTION OF THE INVENTION

The hallmark of this invention is its cocatalyst system. Typically, the system is a catalytic combination of three components, i.e., nitrate ions, either or both bromide and iodide ions, and transition metal ions of at least one transition metal having two or more oxidation states. "Catalytic combination" here means that each component is present in sufficient quantity to contribute to the overall catalytic activity of the system (combination).

The nitrate ion can be supplied by virtually any substance which contains nitrate ion or forms nitrate ion in situ. Inorganic nitrate and nitrite salts and forms of nitrogen oxide, such as NO and $NO_2$, are useful and preferred sources of nitrate ion. The reaction or oxidation rate is at least partially dependent on the concentration of nitrate ion and a certain threshold concentration must be maintained to allow the oxidation to proceed. The presence of nitrate ions in an amount of at least about 0.001 molar, and preferably of about 0.01 molar, in the oxidation mixture is sufficient. Practical consideration, such as convenience and economics, are the only limitations upon the maximum amount of nitrate ions that can be present.

As with the nitrate ions, virtually any substance containing bromine or iodine or forming bromide ion or iodide ion in situ can be used in the practice of this invention. Hydrogen bromide and iodide are preferred, economical sources of the bromide and iodide ions although elemental bromine and iodine as well as various organic bromides and iodides are also useful. The oxidation rate is at least partially dependent upon the concentration of bromide or iodide ion present. The minimum concentration of bromide and/or iodide ion necessary to the practice of this invention will vary dependent upon the organic to be oxidized. However, typically a bromide and/or iodide ion concentration of about 0.001 molar, and preferably of about 0.1 molar, in the reaction or oxidation mixture is adequate. Bromination or iodination of the organics, a side reaction of the wet combustion process, is the principal limitation upon the maximum bromide and/or iodide ion concentration here used. Typically, at concentrations less than about 0.7 molar, this side reaction is of little consequence. Accordingly, the typical maximum bromide and/or iodide ion concentration here used is about 0.7 molar and preferably about 0.5 molar.

The third component of the cocatalyst system used in this invention is transition metal ions of at least one transition metal having two or more oxidation states. The transition metals are defined at p. 882 of *The Condensed Chemical Dictionary*, 8th edition, Van Nostrand Reinhold Co. (1971). The ions of the transition metals of families V, VI, VII and VIII of the Periodic Table are preferred to the ions of the other transition metals with the metal ions of vanadium, cobalt, molybdenum, manganese, and ruthenium especially preferred. These transition metal ions can comprise the third component of the cocatalyst system either alone or in combination with one another.

The oxidation rate of this invention is also at least partially, and generally principally, dependent upon the concentration of transition metal ions. As with the bromide and/or iodide ion concentration, the minimum concentration will vary with the organic to be oxidized. However, a typical minimum concentration of metal ions in the oxidation or reaction mixture is at least about 10 ppm and preferably at least about 100 ppm. Again, as with the nitrate ion concentration, practical considerations are the only limitations upon the maximum metal ion concentration that can be used. A typical maximum is about 1000 ppm and preferably about 500 ppm. Transition metal ion concentrations less than about 10 ppm have only a nominal effect upon the oxidation rate while concentrations in excess of 1000 ppm provide little, if any, advantage over a concentration of about 1000 ppm.

The transition metal ions of this invention are cocatalysts and are thus used in catalytic amounts. If used in stoichiometric amounts, the transition metal ions can oxidize the organic compounds in the absence of the oxidizing agent, nitrate ions, and bromide and/or iodide ions, but would of course be reduced and thus consumed. However, when used in catalytic quantities, and in combination with an oxidizing agent and catalytic amounts of nitrate and bromide and/or iodide ions, the transition metal ions are not consumed and can thus be recycled with the other cocatalysts. Moreover, in combination with the other cocatalysts, the transition metal ions enhance the rate of oxidation of the organic compounds over the known art.

Illustrative of the cocatalyst systems of this invention is the catalytic combination comprising:
(1) a nitrate ion concentration of at least about 0.001 molar,
(2) a bromide and/or iodide ion concentration between about 0.001 and about 0.7 molar, and
(3) a metal ion concentration of between about 10 ppm and about 1000 ppm. "Molar" here means moles of dissolved substance per one liter of aqueous system.

The cocatalyst system of this invention is used in the same manner as the cocatalyst system of U.S. Pat. No. 3,984,311, here incorporated by reference. The aqueous system containing the organic to be oxidized is acidified by supplying hydronium ion. Any acid capable of acidifying the system to the desired pH without being decomposed by the oxidizing agent is suitable. Concentrated mineral acids are preferred. Concentrated nitric acid is especially preferred because it not only reduces the pH but also supplies nitrate ion.

Although a pH of about 4 is necessary to the practice of this invention, a pH of 1 or below is preferred because of its favorable effect upon the oxidation rate.

The oxidizing agent is typically elemental oxygen, generally supplied as air. Typically, sufficient oxidizing agent is supplied to establish a small stoichiometric excess of oxygen over the amount of organic to be oxidized. Conventional oxidizing agents, such as hydrogen peroxide, ozone, persulfate ion, etc., are also usable in this invention but given the convenience and economy of using air, these materials are generally not employed.

The reaction or oxidation mixture is maintained at an elevated temperature. Temperature also influences the oxidation or reaction rate. Temperatures of at least about 100° C. are preferred with temperatures of at least about 150° C. more preferred. Since temperatures in excess of about 300° C. allow oxidation to some degree even in a noncatalyzed system, such temperatures are generally not employed because the advantages of a catalyzed system, e.g., less rigorous reaction conditions, are diminished. Moreover, pressures in excess of 5,000 psig can be developed at such temperatures thus requiring specialized high pressure reaction systems and equipment.

Pressure is important to this invention only as it relates to temperature and thus can range from sub- to superatmospheric. Typically, the invention is practiced at superatmospheric or elevated pressure and the pressure developed from the vapor pressure of the aqueous system and the oxidizing agent is preferred.

The required reaction time will vary with the reaction conditions and especially with the organic compound to be oxidized and the degree of oxidation desired. However, the reaction times required by this invention are generally almost always less than the reaction times required by the prior art.

The aqueous systems of this invention include both aqueous-organic heterogenous mixtures and essentially homogenous aqueous solutions. The former are characterized by the presence of essentially water-insoluble organics, such as various halogenated organics, while the latter are characterized by dissolved, relatively water-soluble organics, such as various carboxylic acids. The aqueous systems here used can also contain particulate matter, such as solid refuse, soil, etc.

Virtually any organic, and many inorganic, compounds can be oxidized by this invention. Not only can such relatively easily oxidized materials such as carboxylic acids, formic acids, aldehydes, ketones, amines, halogenated aliphatics and water-soluble organic phosphorus compounds, mercaptans, organic heterocyclics and sulfides be oxidized, but also difficult to oxidize materials such as the water-insoluble halogenated aromatics, e.g., chlorinated benzenes, polychlorinated biphenyls, etc., and halogenated alicyclics, such as Kepone ®. This invention, like the invention of U.S. Pat. No. 3,984,311, is particularly useful for destroying organic compounds which are not physically separable from the mixtures in which they are contained. The vaporous reaction products of the oxidation are generally carbon dioxide, water, a trace amount of nitrogen or a nitrogen oxide and bromine or iodine. The catalyst materials can be removed, for example by scrubbing, from the oxidation product stream and recycled for use as starting reactants.

The instant invention is fully usable in brines concentrated up to and including the point of saturation and can be practiced either on a batch or continuous basis.

This invention is particularly useful in treating waste streams from manufacturing processes which generate organic or organic-containing wastes. Destruction of these organic compounds often allows reuse of the waste streams as process water. Moreover, some processes generate toxic waste organics, such as dioxins, which need to be destroyed to minimize the detrimental effect on environmental and human health. This process can be successfully designed to handle these and other waste organic problems.

The following are illustrative embodiments of this invention. Unless indicated to the contrary, all parts and percentages are by weight.

SPECIFIC EMBODIMENTS

Example 1

An aqueous mixture of 1,3,5-trichlorobenzene (0.5 g), hydrobromic acid (5.1 g, 48 percent) and deionized water (440 g) was placed into an agitated, 1 liter titanium pressure reactor. The pH of the mixture was about 0.7. The reactor was purged with pure oxygen, pressurized to 60 psig of oxygen and then heated to 200° C. A solution of nitric acid (7 g, 70 percent), vanadyl sulfate (1 g) and water (25 g) was added to the reactor. After two hours, the reactor was allowed to cool and depressurize. The reactor was then opened and washed with a solvent (85 volume percent hexane and 15 volume percent methylene chloride) to collect any unreacted 1,3,5-trichlorobenzene or by-products. The washings were then added to the reaction product and analyzed by gas chromatography. 27.6 Percent of the 1,3,5-trichlorobenzene was destroyed.

Control A

Example 1 was twice repeated except no vanadyl sulfate was employed. Analysis of the reaction product revealed that only 6 percent (average of both control experiments) of the 1,3,5-trichlorobenzene was destroyed, indicative of a destruction or oxidation rate of less than one-fourth of that of Example 1.

Examples 2-6

The procedure of Example 1 was quintuplicated except ruthenium, cobalt, molybdenum and manganese were substituted respectively for vanadium (except for Example 6) and the concentrations of the components of the cocatalyst system were changed. The pH of the reaction mixtures of these examples was about 0.1. The results are reported in Table I.

TABLE 1

| Ex. | $Br^{\ominus}$ $(M)^1$ | $NO_3^{\ominus}$ $(M)^1$ | $M^{\oplus 2}$ | $M^{\oplus 2}$ (ppm) | Wt. % 1,3,5-Trichlorobenzene Destroyed |
|---|---|---|---|---|---|
| 2 | 0.06 | 0.8 | ruthenium | 100 | 77.6 |
| 3 | 0.06 | 0.8 | cobalt | 100 | 78.8 |
| 4 | 0.06 | 0.8 | molybdenum | 440 | 81.4 |
| 5 | 0.06 | 0.8 | manganese | 100 | 84.8 |
| 6 | 0.06 | 0.8 | vanadium | 250 | 76.5 |

[1] Molar
[2] Transition metal ion

These results demonstrate the effectiveness of various transition metal ions in the cocatalyst system.

Controls B-F

Examples 2-6 were repeated except no bromide or nitrate ions were used. The pH of the reaction mixtures of these controls was slightly less than that of the Examples due to the absence of the bromide and nitrate ions. The results are reported in Table II.

TABLE II

| Control | $Br^{\ominus}$ $(M)^1$ | $NO_3^{\ominus}$ $(M)^1$ | $M^{\oplus 2}$ | $M^{\oplus 2}$ (ppm) | Wt. % 1,3,5-Trichlorobenzene Destroyed |
|---|---|---|---|---|---|
| B | — | — | ruthenium | 100 | 19.4 |
| C | — | — | cobalt | 100 | 29.3 |
| D | — | — | molybdenum | 100 | 17.4 |
| E | — | — | manganese | 100 | 24.6 |
| F | — | — | vanadium | 250 | 25.6 |

[1] Molar
[2] Transition metal ion

These data demonstrate that use of the transition metal ions alone results in an oxidation rate inferior to the oxidation rate of the cocatalyst system of this invention.

Examples 7-8

The procedure of Examples 2-6 and Controls B-F was repeated. Vanadium ions were used in both Examples 7 and 8 but bromide ions were used only in Example 7. Iodide ions were used in Example 8. The pH of the reaction mixtures was about 0.1. The results are reported in Table III.

TABLE III

| Ex. | $Br^{\ominus}$ $(M)^1$ | $NO_3^{\ominus}$ $(M)^1$ | $M^{\oplus 2}$ | $m^{\oplus 2}$ (ppm) | Wt. % 1,3,5-Trichlorobenzene Destroyed |
|---|---|---|---|---|---|
| 7 | 0.06 $I^{\ominus}$ $(M)^1$ | 0.8 | vanadium | 250 | 78.3 |
| 8 | 0.06 | 0.8 | vanadium | 250 | 72.5 |

[1] Molar
[2] Transition metal ion

The above data demonstrates the efficacy of iodide ions.

Although this invenition has been described in considerable detail by the above examples, the detail is provided for the purpose of illustration only and is not to be construed as a limitation upon the scope of this invention or the appended claims.

What is claimed is

1. In a method for the oxidation of organic compounds in an aqueous system of pH not more than about 4 to reduce the total organic content of the system, the method comprising oxidizing the organic compound by contacting at a sufficient temperature to effect oxidation of the compound with an oxidizing agent in the aqueous system in the presence of a catalytic amount of a cocatalyst system, the improvement comprising increasing the rate of oxidation of the organic compound by using as the cocatalyst system a catalytic combination of:
   (1) a catalytic amount of nitrate ions,
   (2) at least one of either bromide ions or iodide ions in an amount of at least about 0.001 molar, and
   (3) transition metal ions of at least one transition metal having two or more oxidation states in an amount of at least about 10 ppm.

2. The method of claim 1 wherein the nitrate ions are present in an amount of at least about 0.001 molar.

3. The method of claim 2 wherein the bromide and/or iodide ions are present in an amount of at least about 0.01 molar.

4. The method of claim 3 wherein the transition metal ions are present in an amount of at least about 100 ppm.

5. The method of claim 1 wherein the transition metal ions are the ions of the metals of families V, VI, VII and VIII of the Periodic Table.

6. The method of claim 5 wherein the transition metal ions are the ions of vanadium, cobalt, molybdenum, manganese or ruthenium.

7. The method of claim 5 wherein the transition metal ions are the ions of vanadium.

8. A cocatalyst system useful for the oxidation of organic compounds in an aqueous system of pH not more than about 4 to reduce the total organic content of the system, the composition comprising a catalytic combination of:
   (1) nitrate ions,
   (2) at least one of either bromide ions or iodide ions, and
   (3) transition metal ions of at least one transition metal having two or more oxidation states.

9. The cocatalyst system of claim 8 wherein the transition metal ions are of at least one transition metal from family V, VI, VII or VIII of the Periodic Table.

10. The cocatalyst system of claim 8 wherein the transition metal ions are the ions of at least one metal selected from the group consisting of vanadium, cobalt, molybdenum, manganese and ruthenium.

11. The cocatalyst system of claim 8 wherein the transition metal ions are ions of vanadium.

12. The cocatalyst system of claim 8 in an aqueous system of pH not more than about 4 wherein the nitrate ions are present in an amount of at least about 0.001 molar.

13. The cocatalyst system of claim 12 in an aqueous system of pH not more than about 4 wherein the bromide and/or iodide ions are present in an amount of at least about 0.001 molar.

14. The cocatalyst system of claim 13 in an aqueous system of pH not more than about 4 wherein the transition metal ions are present in a concentration of at least about 10 ppm.

15. The cocatalyst system of claim 14 wherein the transition metal ions are the ions of at least one metal of family V, VI, VII or VIII of the Periodic Table.

16. The cocatalyst system of claim 15 wherein the transition metal ions are the ions of at least one metal selected from the group consisting of vanadium, cobalt, molybdenum, manganese and ruthenium.

17. The cocatalyst system of claim 15 wherein the transition metal ions are the ions of vanadium.

* * * * *